United States Patent
Docherty et al.

(10) Patent No.: US 9,906,837 B1
(45) Date of Patent: Feb. 27, 2018

(54) BINGE CONTENT RECOMMENDATION SYSTEM

(71) Applicant: ThinkAnalytics, El Segundo, CA (US)

(72) Inventors: Peter Docherty, Glasgow (GB); Ewen Cattanach, Woodbridge (GB); Xiaowei Zhang, Glasgow (GB); David Scott, Glasgow (GB); Shahad Ahmed, Glasgow (GB); Alan Ryman, Glasgow (GB); Asim Ullah, Glasgow (GB); Darren Callaghan, Glasgow (GB); Gordon McIntyre, Glasgow (GB)

(73) Assignee: ThinkAnalytics, El Segundo, CA (US)

( * ) Notice: Subject to any disclaimer, the term of this patent is extended or adjusted under 35 U.S.C. 154(b) by 84 days.

(21) Appl. No.: 14/946,573

(22) Filed: Nov. 19, 2015

(51) Int. Cl.
*H04N 21/442* (2011.01)
*H04N 21/466* (2011.01)
*H04N 21/239* (2011.01)
*H04N 21/4147* (2011.01)

(52) U.S. Cl.
CPC ..... *H04N 21/4668* (2013.01); *H04N 21/2393* (2013.01); *H04N 21/4147* (2013.01); *H04N 21/44204* (2013.01); *H04N 21/4667* (2013.01)

(58) Field of Classification Search
CPC .................................................. H04N 21/4826
See application file for complete search history.

(56) References Cited

U.S. PATENT DOCUMENTS

| | | | | |
|---|---|---|---|---|
| 8,924,993 | B1* | 12/2014 | Niebles Duque | H04L 29/06462 725/9 |
| 2007/0157237 | A1* | 7/2007 | Cordray | H04H 60/65 725/42 |
| 2007/0169148 | A1* | 7/2007 | Oddo | H04N 5/44543 725/46 |
| 2014/0304726 | A1* | 10/2014 | Hansen | H04N 21/251 725/14 |
| 2015/0037009 | A1* | 2/2015 | Wang | H04N 5/76 386/248 |

* cited by examiner

*Primary Examiner* — Nathan Flynn
*Assistant Examiner* — Christine Kurien
(74) *Attorney, Agent, or Firm* — FSP LLC

(57) ABSTRACT

A method of setting controls on a digital communication device operated by an end user participant in a digital content event provided from a digital communication network includes operating a tracking control in the digital communication network to track activity of the digital communication device in a context of the digital content event, applying the activity to a content series detector, applying an output of the content series detector to a series gap detector, and applying the time-stamped set of ranking controls and content inputs from a digital content manager to operate a ranking control and digital filter to generate a control interface for the digital communication device, the control interface comprising a plurality of individually operable controls to configure the digital communication device with the control interface.

18 Claims, 16 Drawing Sheets

BINGE CONTENT RECOMMENDATION SYSTEM

CROSS-REFERENCE TO RELATED APPLICATIONS

This application claims priority and benefit under 35 U.S.C. 119 to U.S. application Ser. No. 62/081,737, filed on Nov. 19, 2014 and incorporated by reference in its entirety herein.

BACKGROUND

In a content-rich world, consumers (i.e., end users) are overwhelmed by the viewing choices available to them on TV, Video on Demand, the Internet, mobile, etc. This rapidly becomes an irritating experience as, each time, they click through channel-after-channel on the TV listings or wander through the VOD library. The result—consumers stick to watching what they already know, and after a while begin to question whether they are getting value for their subscription money. In this situation customer retention becomes a problem. The fact is consumers cannot select what they don't know—so 'Search' alone is the wrong approach to a constantly changing Electronic Program Guide or large VOD library.

It is valuable to expose consumers to a wider range of content than they would normally discover for themselves. Where the consumer explicitly declares a wide range of tastes this is relatively simple to achieve, but in many cases the consumer may be cautious or lazy and will declare a narrow range of tastes or even none. For instance, they may often start by declaring only gender, age and perhaps one taste area.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
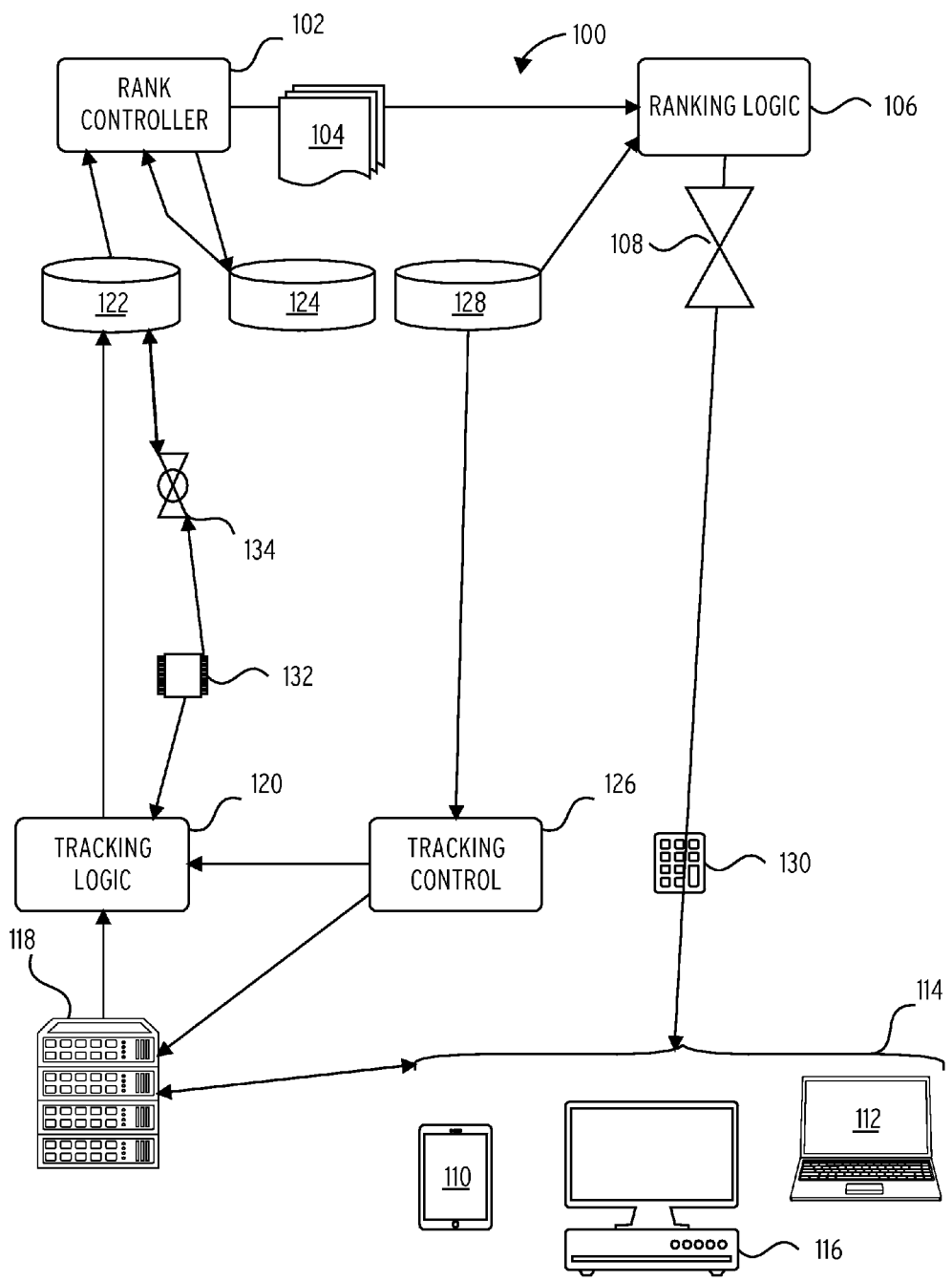
FIG. 1 illustrates aspects of a system for configuring a control interface for a communication device 100 in accordance with one embodiment.
Figure 2:
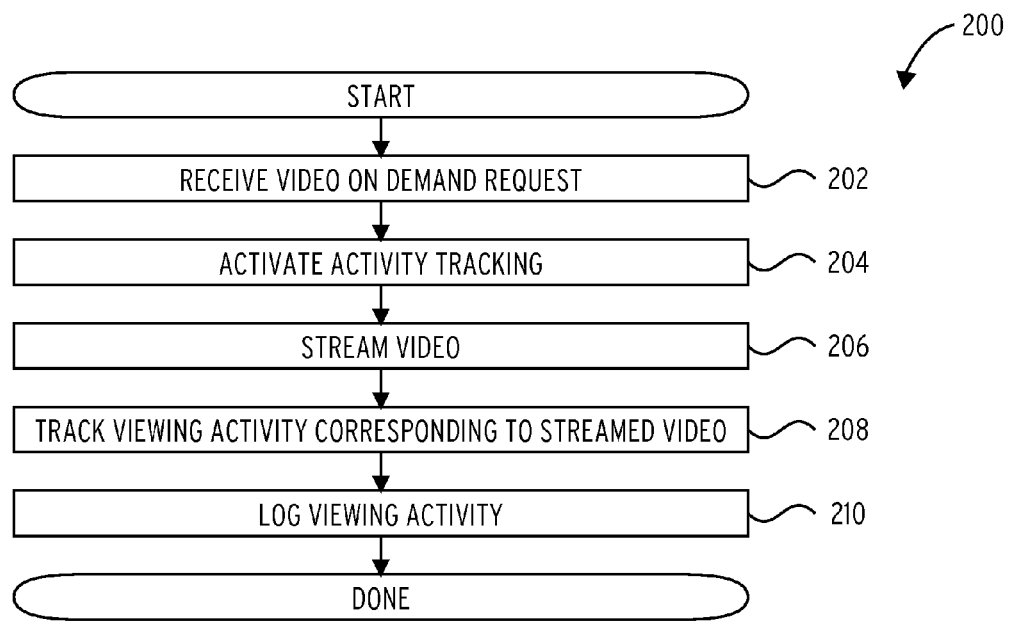
FIG. 2 illustrates a machine control interface configuration process 200 in accordance with one embodiment.
Figure 3:
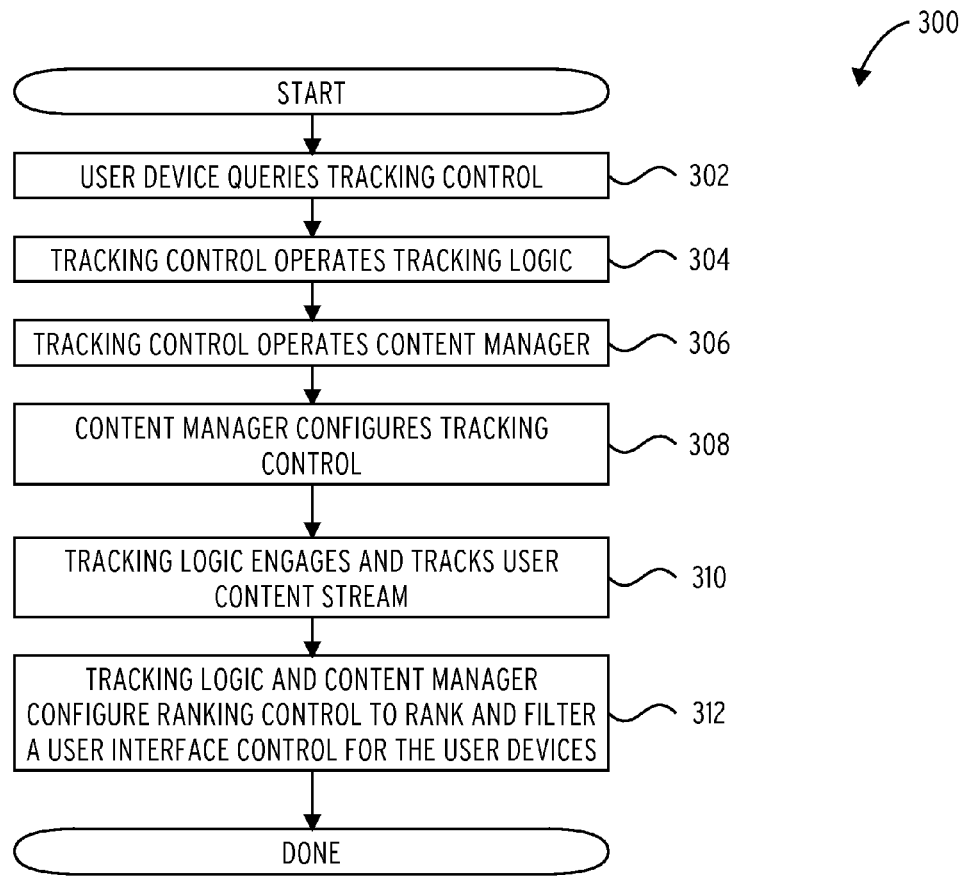
FIG. 3 illustrates a machine control interface configuration process 300 in accordance with one embodiment.
Figure 4:
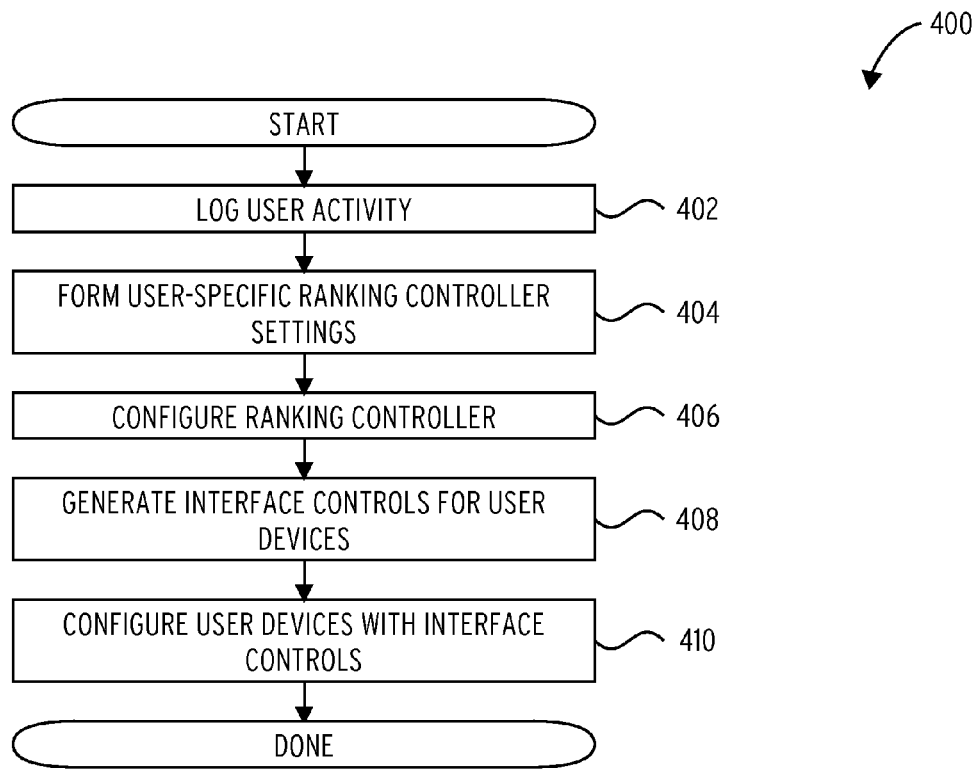
FIG. 4 illustrates a machine control interface configuration process 400 in accordance with one embodiment.

Described herein are embodiments of systems and processes that may be utilized to recommend digital content to users of a networked content storage and delivery system, such as provided by cable television or Internet video/audio web sites. In some embodiments, a one or more computing apparatus embodying these systems and processes may operate a tracking control in a digital communication network to track activity of digital communication device (i.e. end user devices) in a context of a digital content event. A timer may be operated in conjunction with the activity to form a time-stamped set of ranking controls. The time-stamped set of ranking controls may be attenuated according to an elapsed time. The time-stamped set of ranking controls and content inputs from a digital content manager may be applied to operate a ranking control and digital filter to generate a control interface for the digital communication device. The control interface may include a group of individually operable controls. The digital communication device may be configured with the control interface. The group of individually operable controls each operable to cause a video server to stream a different digital video to the digital communication device.

The tracking control may be operated on a digital personal video recorder associated with the digital communication device. A sub-stream filter may be operated on the digital content event to generate an extracted digital sub-stream. A speech-to-text converter may be operated on the extracted digital sub-stream to generate a digital text sequence. The digital text sequence may be applied to adapt the time-stamped set of ranking controls into adapted ranking controls.

In some embodiments, the extracted digital sub-stream is a voice-over audio track for a video animation. An effect of the digital text sequence on the adapted ranking controls may be attenuated to lower than an effect on the adapted ranking controls by a non-voice-over audio track.

The digital content event may be correlated to serial content based on a threshold level of the serial content represented in the time-stamped set of ranking controls. Gaps in the activity associated with the serial content represented in the time-stamped set of ranking controls may be detected, and the control interface adapted with controls corresponding to the gaps.

In one implementation, the system prioritizes new learning as to user preferences for content over old learning of the user preferences. To this end, a preference formulator may engage with a ranking module to weight more heavily or rank higher learnings from a learned preference database having a more recent timestamp. In support of this feature, search and viewing activity logged to an activity history database by the tracking module may by timestamped. Learned preference updates to the learned preference database from the preference formulator may be weighted by their newness, then aged (weights reduced) over time.

Search activity by a user may be tracked and applied to formulate preference learning. In one embodiment, queries from a user device (set top box STB, mobile phone, personal computer, tablet device, etc.) are communicated to a search logic (e.g., tracking controller, which may interface with one or more commercial search engines, not illustrated). In addition to engaging a search of the (one or more) content database for titles matching the query, the search module may also notify the tracking logic of the search activity. The tracking logic may log the search activity (associated with a user identifier and also possibly timestamped) in an activity history database for later application to preference formulation. A learned preference database may in some embodiments comprise user profiles, and thus a user's search activity may be applied to learn and formulate a user profile. Content recommendations for a particular user may also be learned in some implementations from search and viewing activity of other users having a threshold level of common characteristics. The recommendations for the other users may be referred to herein as "related content recommendations".

In one embodiment a filter may be utilized to limit the results of search queries and/or recommended content titles to only those titles that have either (1) been viewed by the user before (and thus are recorded in the activity history for the user), or (2) are "favorites" of the user making the query. Favorites may be identified in a number of ways. For example, favorites may be identified as those titles that are most frequently watched and/or searched (e.g., the activity type "viewed" or "searched" has a value above some set threshold); favorites may be identified as those titles viewed and/or searched most recently as indicated by the activity timestamp; favorites may be identified as those titles having a highest associated activity level, meaning a total number of activity types (including interaction/engagement with a title being viewed); favorites may be identified from combinations of these factors, such as frequency of activity/search and also recentness of activity/search. In one embodiment, search results and/or recommendations reflect only content available on certain channels identified as user favorites, or are ranked more highly if they are on a favorite channel (e.g., ShowTime, HBO, ScyFi). Favorite channels may be identified by activity levels (positive activity) above a set threshold level for content from a same channel.

The system may recommend to a user other system users to share a content experience, i.e. to "watch with". See FIG. 8-11. Activity from multiple user devices 810, 812 is tracked and formed into updates to an activity history database 806 for the users. A user matching module 808 compares user profiles and forms matching sets based on aggregate similarities in activity or user preferences (e.g., similar user profiles). Recommendations are then provided to the users in similar sets, so that the users are aware of upcoming opportunities to view/interact with content that other like-minded viewers will be watching. The user's search activity may also influence the watch-with recommendations, as it may affect the user's profile (see learned preference database 108 and preference formulator 104).

The system may search or recommend content to and from a personal video recorder (either on-premise or a network PVR). Various interacting sub-components may be utilized to formulate digital content recommendations for consumers of network-hosted content (the recommendations possibly ranked and filtered as well).

The system may supply recommendation(s) to the video server, which obtains the recommended title(s) from a content management system and streams (or downloads) the title to the personal video recorder (which may be on user premise or network hosted). The user then later views the content of the title from the PVR using their user device. In another embodiment, content detected on the PVR may be identified and provided to the system for influencing future recommendations (it may be detected as a form of user activity involving the content). Fast forward, rewind, and other PVR behaviors may be identified as specific activity types influencing preference formation. (e.g., rewind and replay is reinforcing of a preference for the reviewed content; fast forward indicates a distaste for the skipped or skimmed content).

The system may attenuate the importance of voice-overs in animated content when forming content recommendations. Voice-over content (audio) may be filtered from the digital video stream (e.g., animation with a voice-over actor). The extracted voice-over (speech) may be converted to text symbols (words, phrases, sentences, etc.) and this text may then be analyzed for information about the subject matter of the overall content (e.g., the underlying animation), which in turn may be correlated in time with user activity directed at/for the overall content. However, if the underlying content is animation (or other narrated scenes in a video, for example), the system may give less weight to the voice-over content when forming recommendations than to the spoken words of human actors.

The system may recommend content that belongs to a content series. In one embodiment, viewing and/or search activity is recorded in a user activity database. This activity (mostly or all viewing activity, in one embodiment) is analyzed by a content series detector. If a level of activity by a user (or group, such as a family in a same household) involving episodes of a content series (television series, mini-series, multi-part feature, etc.) exceeds a set threshold, the system may identify the content series and recommend any gaps in the activity (missed episodes, or upcoming episodes, for example) to the user device. These gaps (missed episodes or upcoming next episodes in the series) may be ranked highly in recommendations or returned search results (a "don't miss this episode" functionality). In some implementations, the system may recommend an entire content series to the user, based on activity involving a single or few episodes of the series, or based on activity by the user involving content characteristic of the series as a whole (vs particular episodes). The system may prioritize (rank highly or highest in a list of recommendations or search results) a next to be released episode in a series. In some cases, this high ranking only takes place when there is a threshold level of user activity already for the series. In other cases, the high ranking is made for a next episode of the series in particular, when the series itself is recommended for any reason.

DRAWINGS

FIG. 1 illustrates aspects of a system for configuring a control interface for a communication device 100 in accordance with one embodiment.

The system for configuring a control interface for a communication device 100 comprises a rank controller 102, ranking controls 104, ranking logic 106, filter 108, tablet or phone 110, personal computer 112, end user devices 114, set top box 116, video server 118, tracking logic 120, activity record database 122, adapted user rank controls 124, tracking control 126, content manager 128, and machine interface controls 130.

At block 202 the video server 118 receives a video on demand (VOD) request signal from one or more end user devices 114. The video server 118 activates the tracking logic 120 at block 204 to begin tracking activity by and from the end user devices 114, such as length of viewing, pauses, searches, selections (e.g., of ads or other supplemental content), fast forward, rewind, and so on.

Digital video content is streamed to the end user devices 114 by the video server 118 at block 206. Activity is tracked (block 208) and logged on a machine record (block 210).

The end user devices 114 query the tracking control 126 (block 302) which activates the tracking logic 120 (block 304) to record the query, and which operates the content manager 128 to obtain settings (e.g., comprising content titles) matching the query. These settings may be communicated to the end user devices 114, which may then activate a VOD stream from the video server 118.

The tracking control 126 is configured by the results from the content manager 128 (block 308) and the tracking logic 120 to detect and log in the activity record database 122 activity of the end user devices 114 on the video stream (block 310). The tracking control 126 co-operates a timer 132 to time-stamp activity by the end user devices 114. The timer 132 may also be applied to an attenuator 134 that operates on controls in the activity record database 122 to attenuate the effect of the controls on the rank controller 102 over time (e.g., to 'decay' the effects of older activities on the rank controller 102).

The rank controller 102 forms ranking controls 104 based on the user's activity as recorded in the activity record database 122 and further according to the adapted user rank controls 124 formulated over time based on, for example, similar activity by other users (see later Drawings for more detail).

The tracking logic 120 is responsive to the ranking controls 104 and configuration information about content titles obtained from the content manager 128 to generate machine interface controls 130 that are passed through a filter 108 and then applied to the end user devices 114 (block 312). The machine interface controls 130 may comprise, in one embodiment, an ordered arrangement of active areas on a machine display, each particular area of the active areas configured to cause activation of streaming by the video server 118 of a particular video stream when the particular active area is operated by one or more of the end user devices 114.

User activity on the end user devices 114 is logged (block 402) and this activity is applied to form user-specific settings for the rank controller 102 (block 404). The rank controller 102 is configured (block 406) and operated to generate machine interface controls 130 for the end user devices 114 (block 408). The end user devices 114 are configured with the machine interface controls 130 (block 410).

Figure 5:
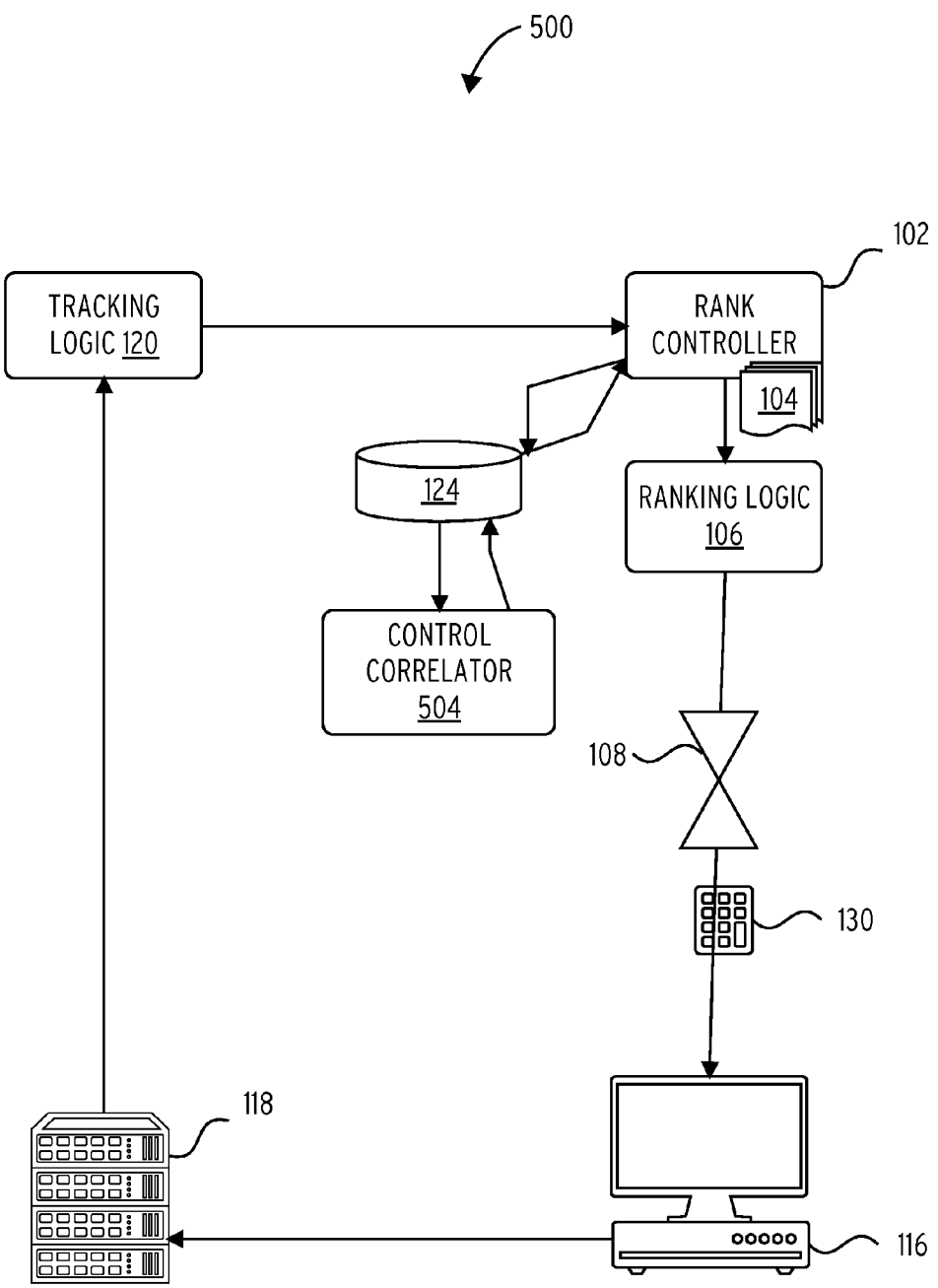
FIG. 5 illustrates a machine feedback circuit 500 in accordance with one embodiment.
Figure 6:
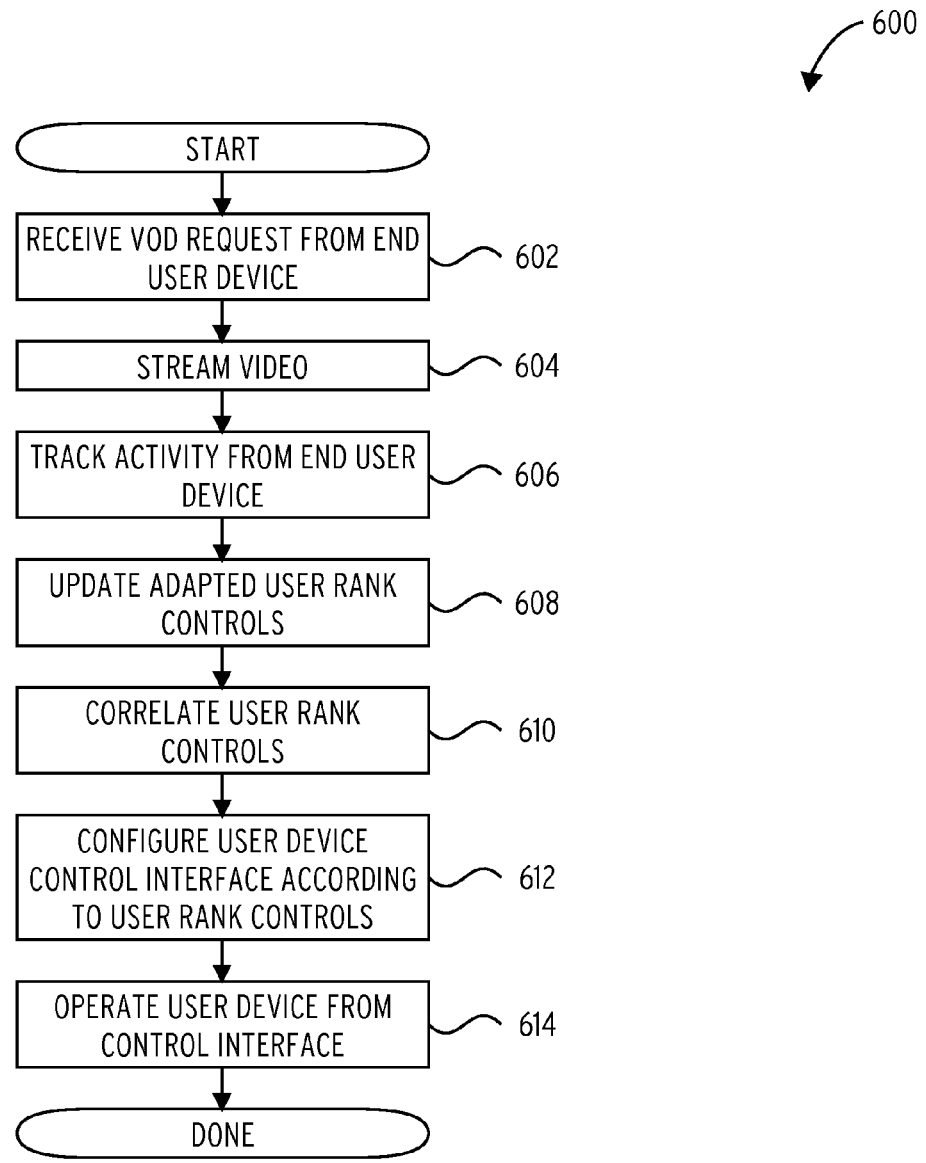
FIG. 6 illustrates a device configuration and control process 600 in accordance with one embodiment.

FIG. 5 illustrates a machine feedback circuit 500 in accordance with one embodiment. The machine feedback circuit 500 comprises a video server 118, adapted user rank controls 124, control correlator 504, and set top box 116. The set top box 116 is representative of the end user devices 114 and could be any suitable device of this type.

User activity with the set top box 116 is communicated via the video server 118 to the tracking logic 120 (other embodiments may not utilize the video server 118 to intermediate this communication). The tracking logic 120 influences the rank controller 102, which accesses control settings stored by the adapted user rank controls 124. The adapted user rank controls 124 are adapted and changed over time by a control correlator 504.

The rank controller 102 operates ranking logic 106 to generate machine interface controls 130 which are applied through a filter 108 to the set top box 116.

Thus for example a video on demand request may be received from one or more of the end user devices 114 (block 602) and digital video is streamed to the one or more end user devices 114 by the video server 118 in response (block 604). activity by the one or more end user devices 114 is tracked (block 606) and the adapted user rank controls 124 are changed (e.g., updated, block 608). The adapted user rank controls 124 are matched with the user rank controls of other users having an activity history (e.g., behavior and preferences for certain types of video content) that strongly correlate with the user ranking controls 104, and the ranking controls 104 may be set or changed to reflect this correlation (block 610). The end user devices 114 are then set (block 612) and operated (block 614) according to machine interface controls 130 formed by the ranking logic 106 and filter 108 as configured by the ranking controls 104.

Figure 7:
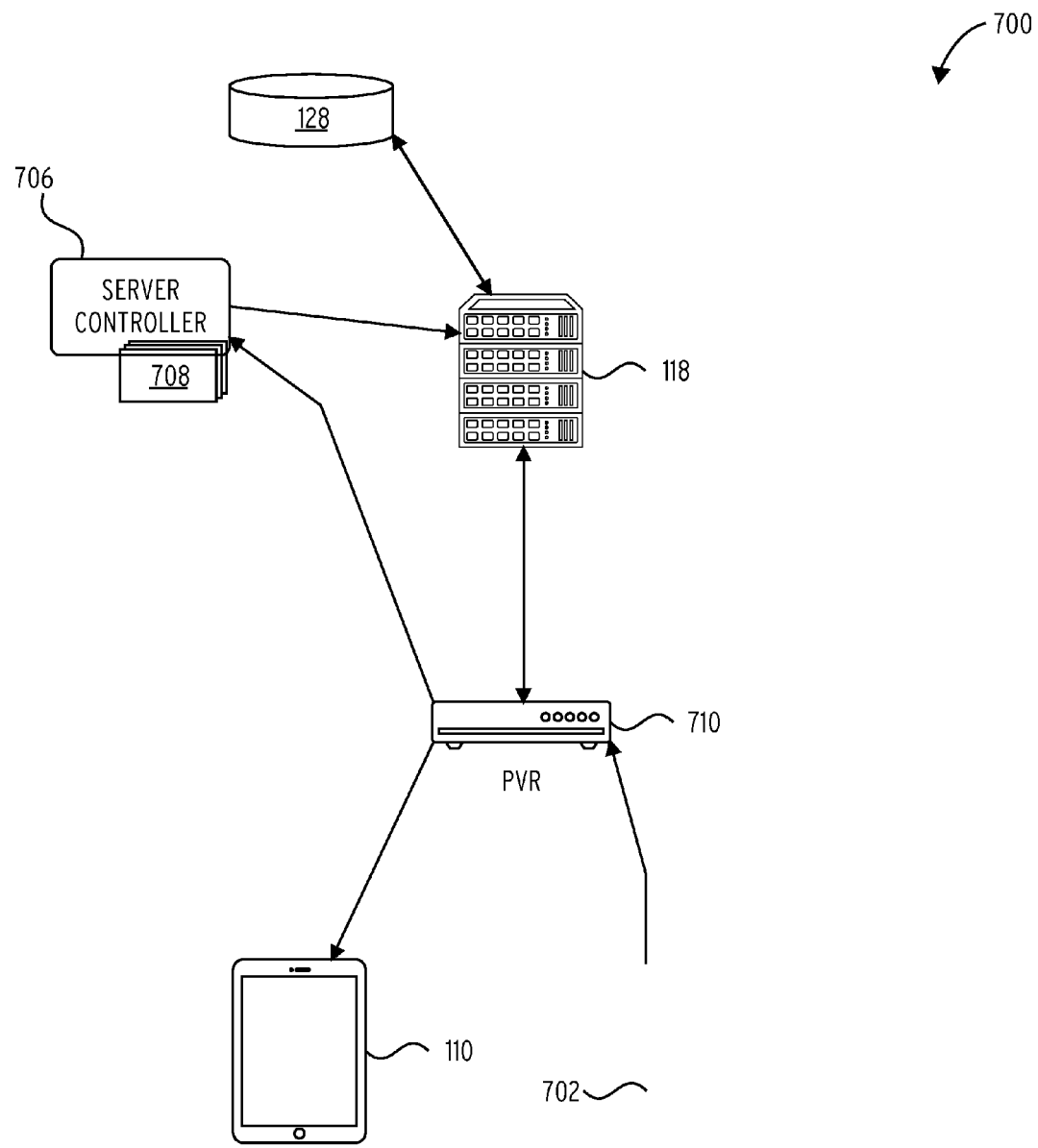
FIG. 7 illustrates a system to configure a personal video recorder 700 in accordance with one embodiment.
Figure 8:
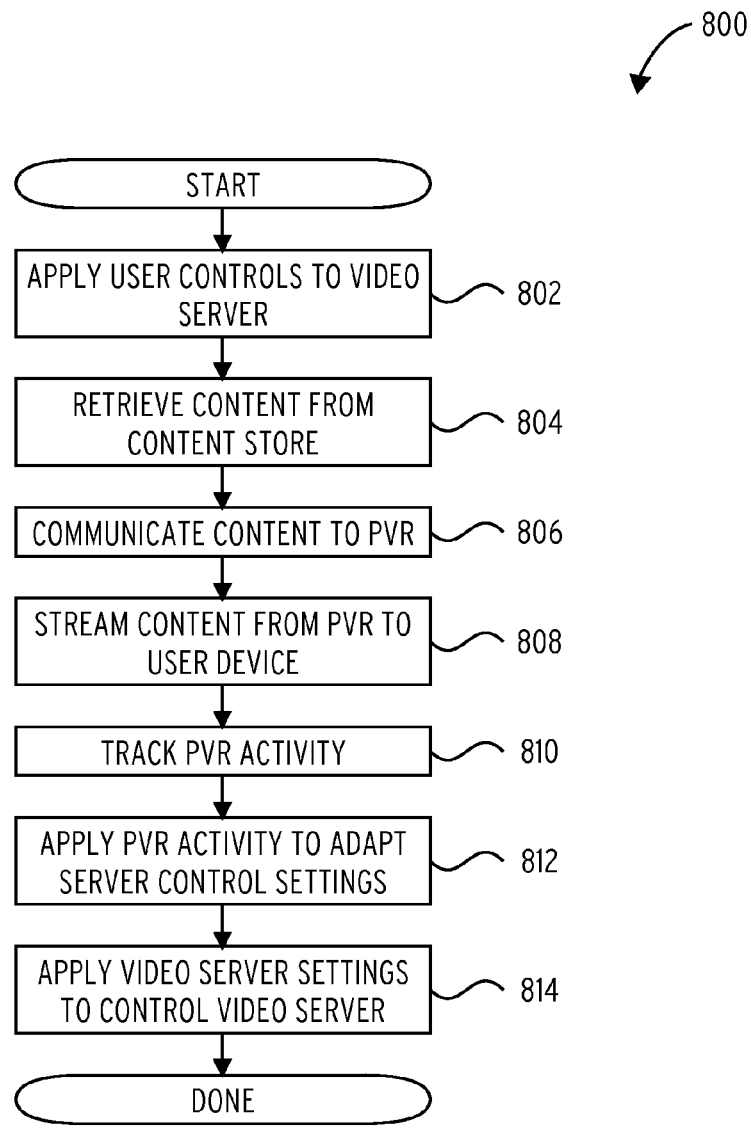
FIG. 8 illustrates a video server control configuration process 800 in accordance with one embodiment.

FIG. 7 illustrates a system to configure a personal video recorder 700 in accordance with one embodiment. User activity with a tablet or phone 110, or a remote control 702 (for example) that affects a personal video recorder 710 may be tracked and utilized to adapt the video server control settings 708 applied by a server controller 706 to the video server 118. For example video content from the content manager 128 stored in the memory of the personal video recorder 710 may be applied as configuration information to affect the video server control settings 708.

The adapted user rank controls 124 are applied to the video server 118 (block 802), causing the video server 118 to retrieve video content from the content manager 128 (block 804) and communicate the video content to the personal video recorder 710 (block 806). From the personal video recorder 710, the content is streamed to the end user devices 114 (block 808).

activity by the personal video recorder 710 as controlled by the end user devices 114 or remote control 702 is tracked (block 810), and this activity is applied to adapt the adapted user rank controls 124 (block 812), which are applied to control operation of the video server 118 (block 814).

Figure 9:
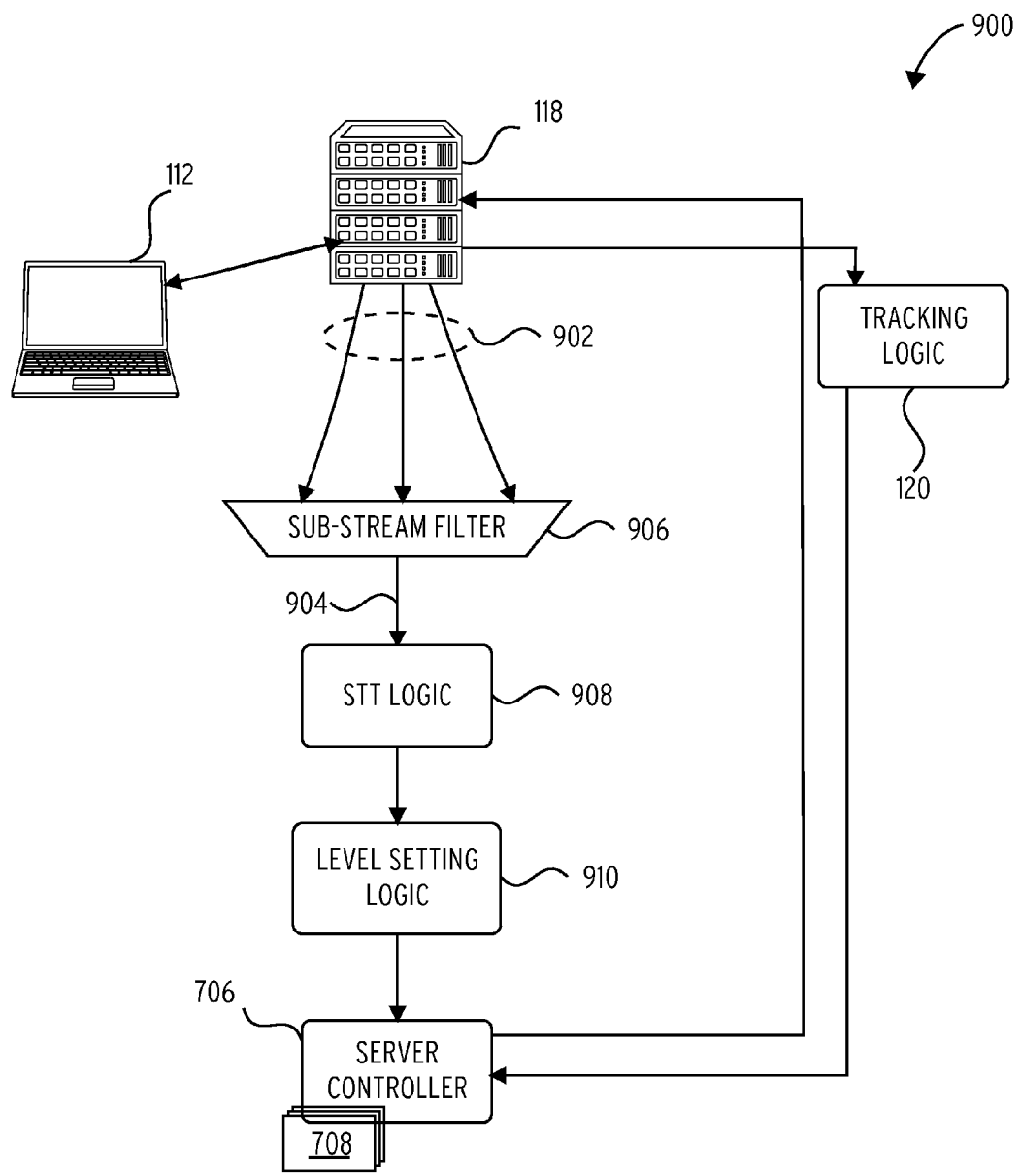
FIG. 9 illustrates a machine feedback circuit 900 in accordance with one embodiment.
Figure 10:
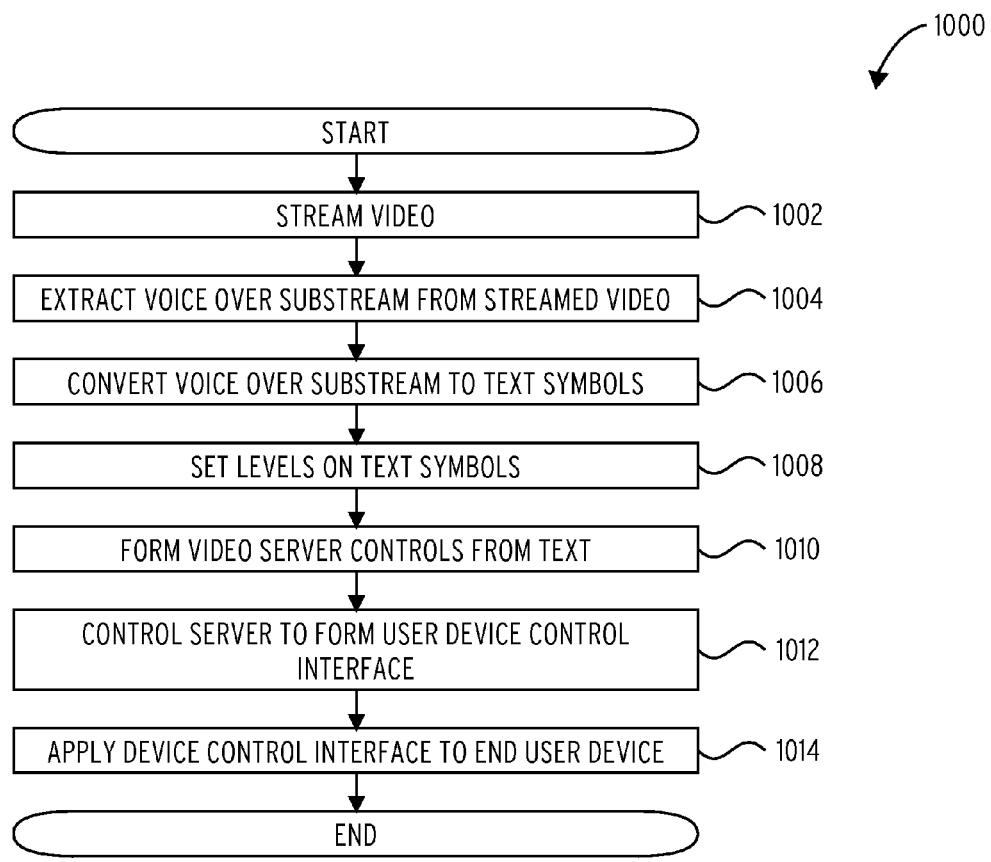
FIG. 10 illustrates an aspect of the subject matter in accordance with one embodiment.

FIG. 9 illustrates a machine feedback circuit 900 in accordance with one embodiment. The machine feedback circuit 900 comprises a personal computer 112 (or other end user device), a video server 118, tracking logic 120, a sub-stream filter 906, speech-to-text conversion logic 908, level setting logic 910, and a server controller 706 configured with video server control settings 708.

The video server 118 streams video (block 1002) to the personal computer 112, for example in response to a VOD request from the personal computer 112. The video stream 902 is also communicated to the sub-stream filter 906, which extract a voice over sub-stream 904 from the video stream 902 (block 1004). The voice over sub-stream 904 is input to the speech-to-text conversion logic 908 and there converted to a text sequence (block 1006). The level setting logic 910 sets levels on sub-sequences of the text sequence, e.g., particular words and phrases are attenuated in control status (block 1008), and the text sequence is applied to adapt the video server control settings 708 of the server controller 706 (block 1010), which then controls the operation of the video server 118 to form the machine control interface configuration process 300 (block 1012) that is applied to the personal computer 112 (block 1014).

Figure 11:
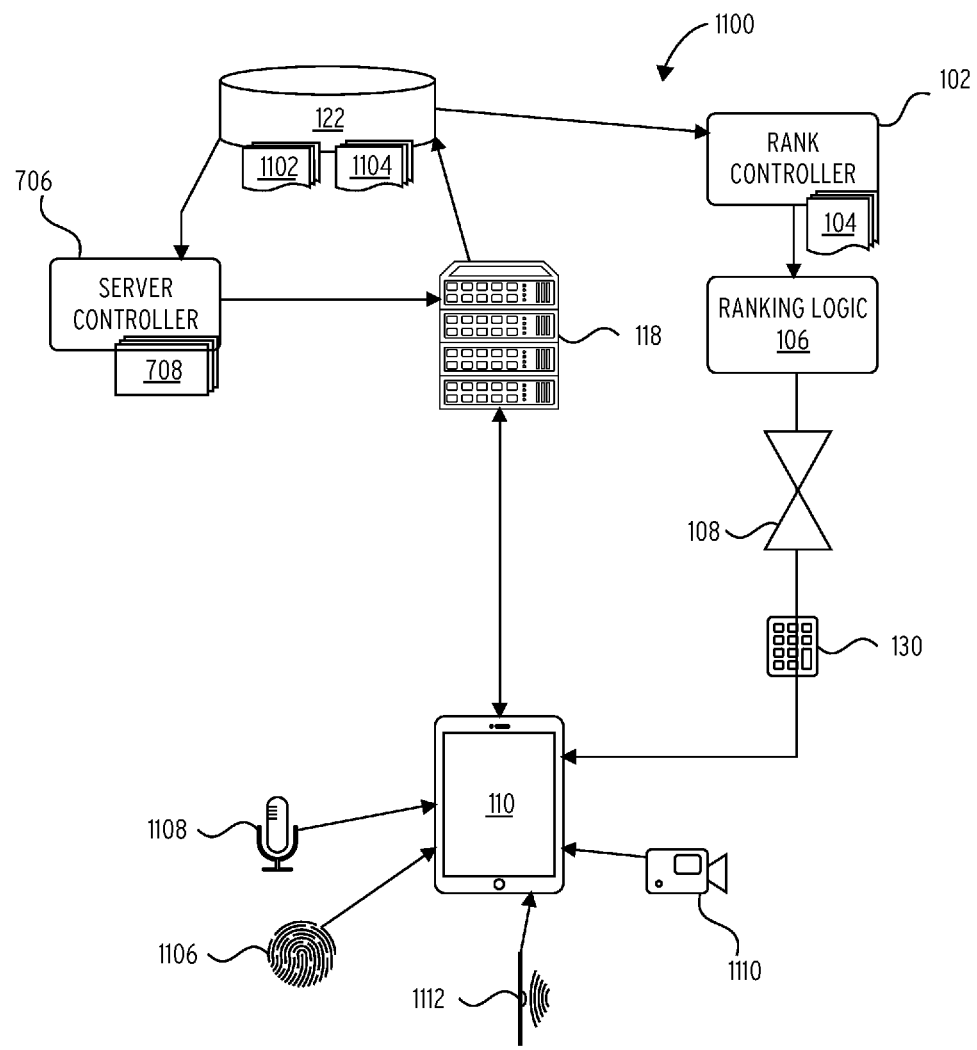
FIG. 11 illustrates a video server and end user device control system 1100 in accordance with one embodiment.
Figure 12:
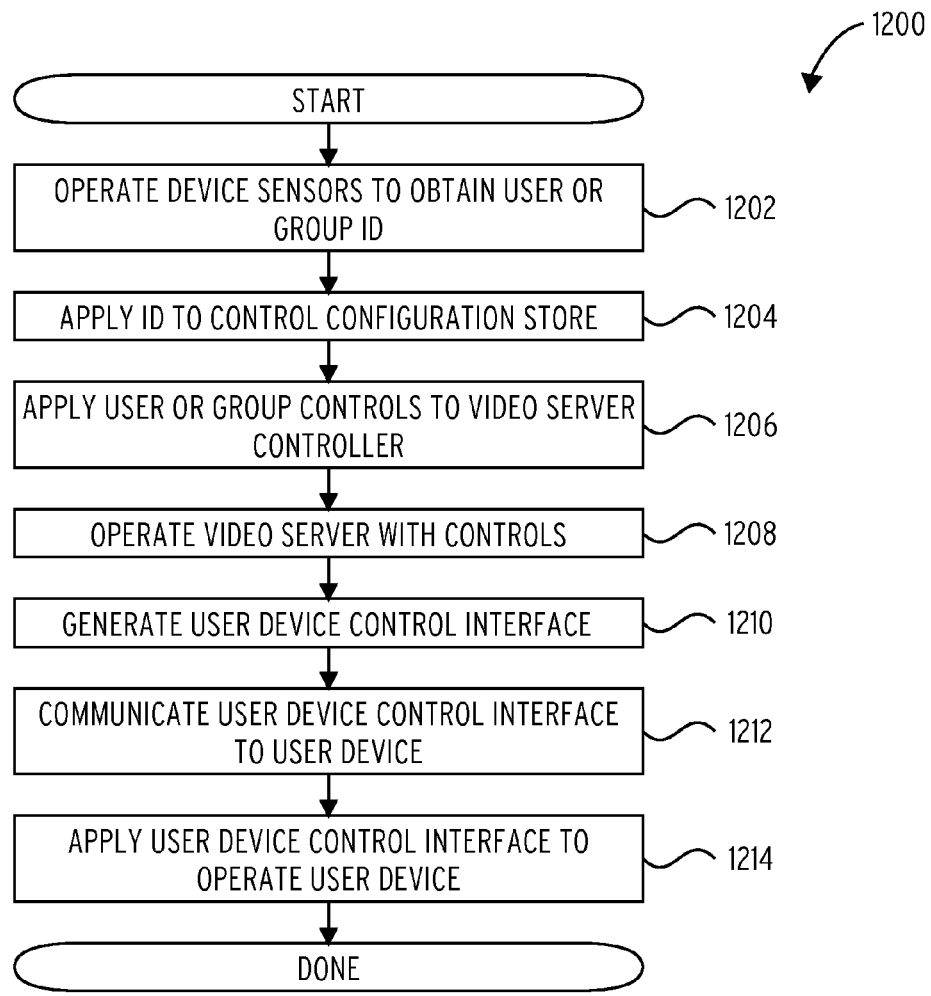
FIG. 12 illustrates a method for operating a video server and configuring a control interface on a user device 1200 in accordance with one embodiment.

FIG. 11 illustrates a video server and end user device control system 1100 in accordance with one embodiment.

Sensors of the end user devices 114 are operated to generate a user or group (e.g., family or home) identification (block 1202). Examples of sensors are fingerprint scanner 1106, microphone 1108, camera 1110, and wireless device detector 1112 (e.g., WiFi SSID detector). The end user or group id is applied to control the activity record database 122 (block 1204), which comprises user configuration controls 1102 and group configuration controls 1104. These controls are applied to affect the server controller 706 by adapting the video server control settings 708 (block 1206). The video server 118 is operated according to the video server control settings 708 (block 1208).

The user configuration controls 1102 and group configuration controls 1104 are also applied to the rank controller 102 to affect operation of the tracking logic 120 and the filter 108 to generate the machine interface controls 130 (block 1210). These are communicated to the end user devices 114 (block 1212) and applied to operate the end user devices 114 (block 1214).

Figure 13:
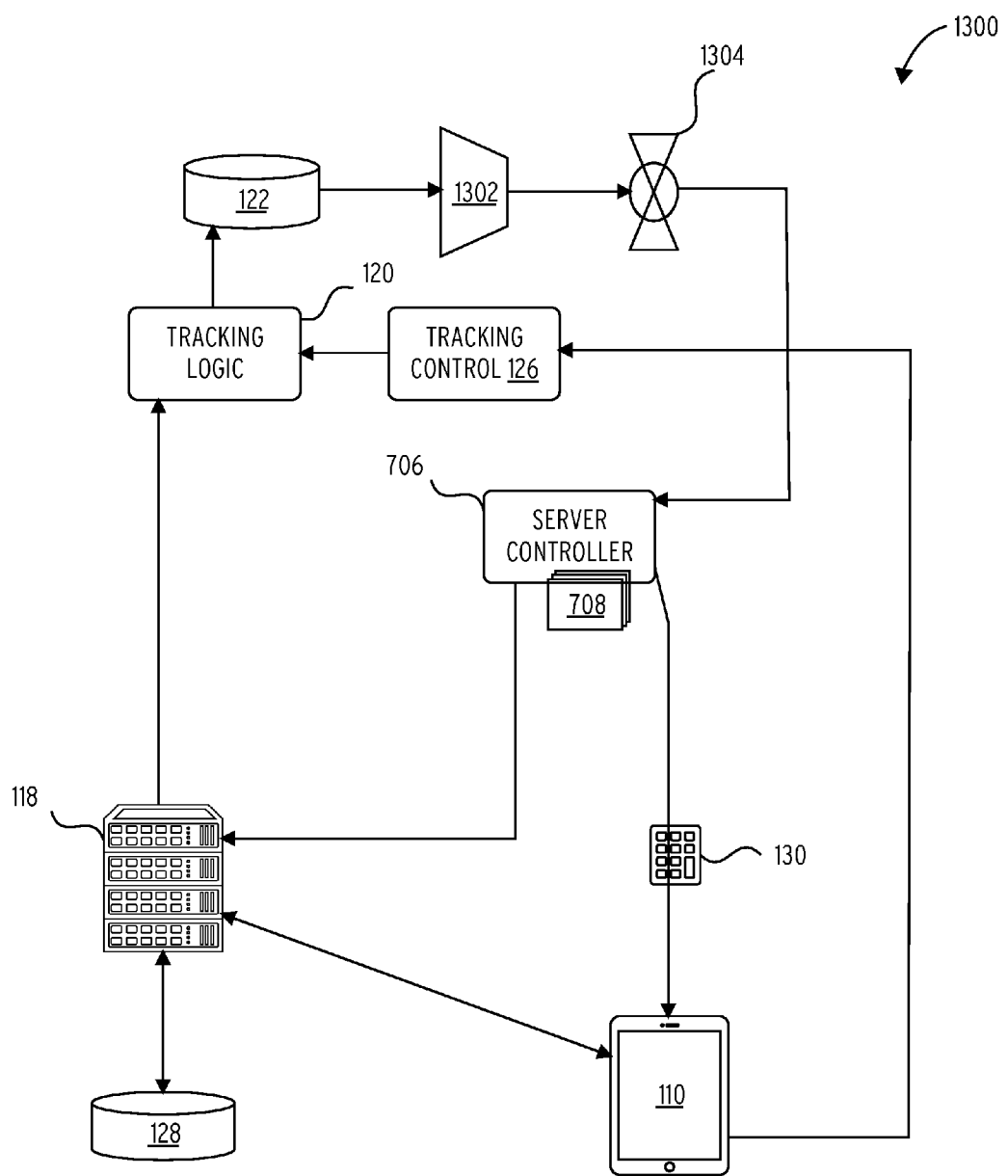
FIG. 13 illustrates a video server and end user device control system 1300 in accordance with one embodiment.
Figure 14:
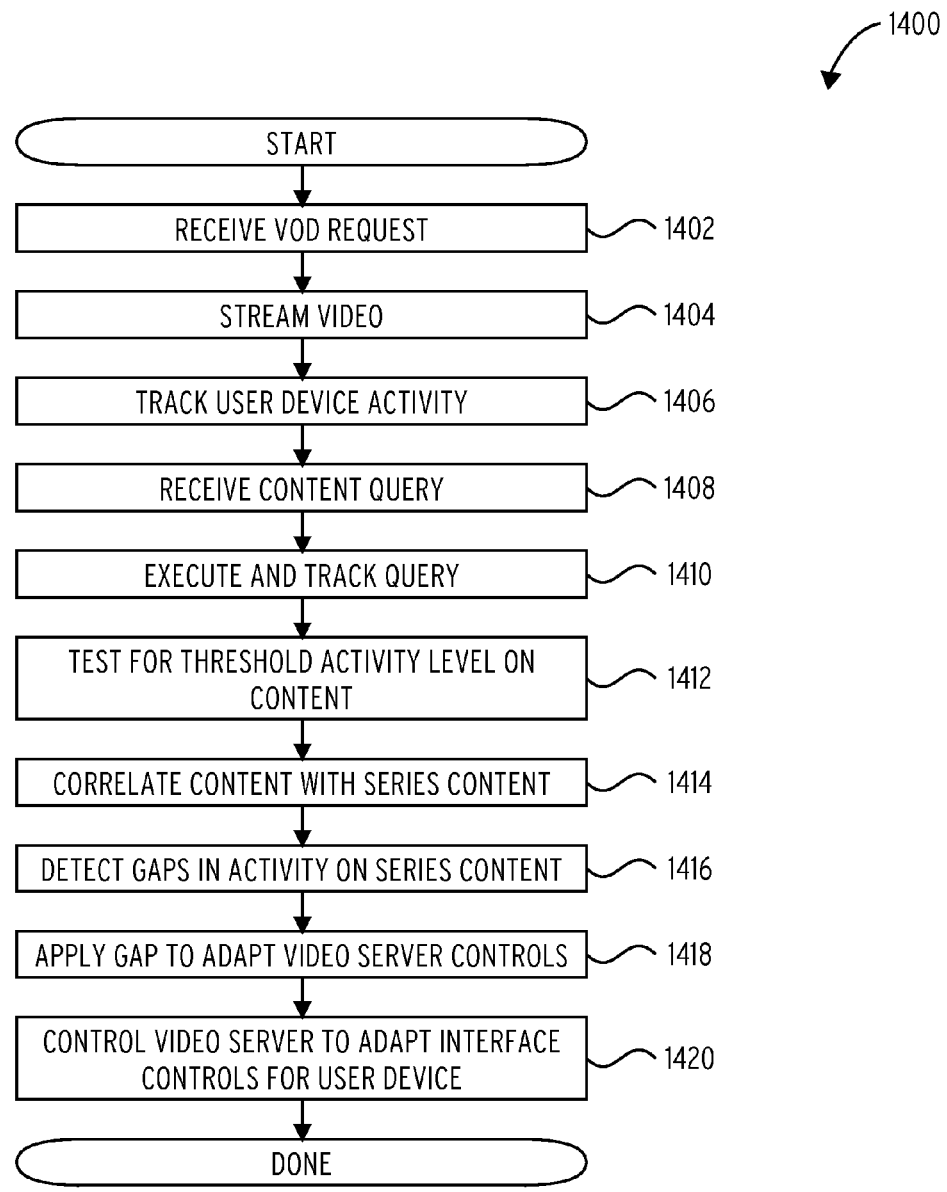
FIG. 14 illustrates a video server and end user device control process 1400 in accordance with one embodiment.

FIG. 13 illustrates a video server and end user device control system 1300 in accordance with one embodiment.

A VOD request (for example) is received by the video server 118 (block 1402) which streams video to the end user devices 114 (block 1404). User activity with the end user devices 114 is tracked (block 1406—see previous Drawings). The system receives a content query (block 1408) and executes and tracks (e.g., records in the activity record database 122) the query (block 1410).

A test (block 1412) is performed (e.g., by the content series detector 1302) for a threshold activity level on the video stream and a set of associated content (e.g., files forming episodes of a content series). If the threshold is met, the series content is correlated with the video stream and/or end user (block 1414), and gaps in the activity record database 122 are identified for the series content and the end user devices 114 or end user or group (block 1416). These gaps are applied to adapt the video server control settings 708 (block 1418). The video server 118 is controlled with the adapted video server control settings 708 and the machine interface controls 130 are adapted to provide controls for activation of content in the gap from the video server 118 when operated (block 1420).

Figure 15:
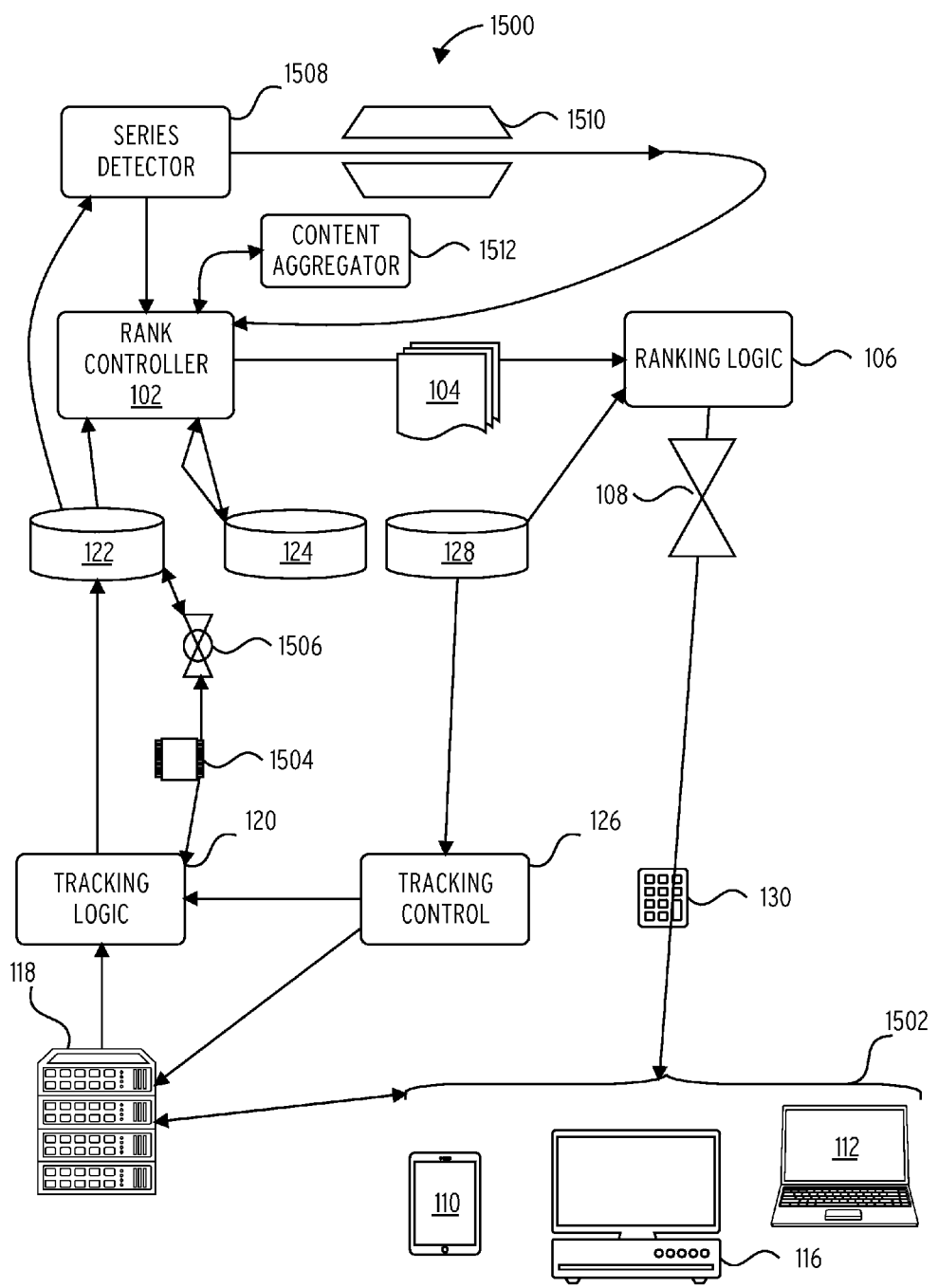
FIG. 15 illustrates aspects of a system for configuring a control interface for a communication device 1500 in accordance with one embodiment.

FIG. 15 illustrates aspects of a system for configuring a control interface for a communication device 1500 in accordance with one embodiment.

The system may recommend content to fill gaps in an experienced content series. In one embodiment, viewing and/or search activity involving the end user devices 1502 is recorded in the activity record database 122. This activity (mostly or all viewing activity, in one embodiment) is analyzed by a series detector 1508. If a level of activity by a user (or group, such as a family in a same household) involving episodes of a content series (television series, mini-series, multi-part feature, etc.) exceeds a set threshold, the system may identify the content series and utilize a gap detector 1510 to identify gaps in the viewing activity for the series. The rank controller 102 may generate ranking controls 104 to prioritize content to fill gaps in the activity (missed episodes, or upcoming episodes, for example) These gaps (missed episodes or upcoming next episodes in the series) may be formulated into user machine interface controls 130 that are filtered and applied to the end user devices 1502. n some implementations, the system may generate the machine interface controls 130 around an entire content series, based on activity involving a single or few episodes of the series, or based on activity by the end user devices 1502 involving content characteristic of the series or a related series as a whole (vs particular episodes). The system may prioritize (rank highly or highest in a list of recommendations or search results) a next to be released episode in a series or related series. In some cases, this high ranking only takes place when there is a threshold level of user activity already for the series or a related series. In other cases, the high ranking is made for a next episode of the series in particular, when the series itself is recommended for any reason.

The rank controller 102 forms ranking controls 104 based on the user's activity as recorded in the activity record database 122 and further according to the adapted user rank controls 124 formulated over time based on, for example, similar activity by other users. One type of ranking controls 104 pertains to gaps in series content activity by the end user devices 1502 as recorded in the activity record database 122.

The series detector 1508 identifies content having an episodic relationship. This may be done in a number of ways that will be evident to those of skill in the arts in view of this disclosure. For example, this may be done by finding a common content series identifier for different content activity recorded in the activity record database 122, or by analyzing the content for common actors, directors, themes, etc. A totality of content history localized into series may then be applied to a gap detector 1510 and fed back to the rank controller 102.

The gap detector 1510 receives a content series from the series detector 1508 and in response analyzes the content series for gaps in the series content (missed episodes, upcoming episodes, a next episode, incompletely viewed episodes).

User activity on the end user devices 1502 is logged and this activity is applied to form user-specific settings for the rank controller 102. The rank controller 102 is configured and operated to generate machine interface controls 130 for the end user devices 1502. The end user devices 1502 are configured with the machine interface controls 130.

To form a binge recommendation, the series detector 1508 obtains a content set (a collection of content titles, for example) from the activity record database 122 and identifies a content series with which the viewer or viewers have interacted via the end user devices 1502. Examples of content series are television series, miniseries, reality shows, or any repeating episodic content. The gap detector 1510 receives one or more content series from the series detector 1508 and compares the content series and viewer activity to find gaps in the user's interactions with the series. A "gap" may be missed episodes bounded by episodes the user has watched, or episodes at the beginning or end of the series that the user has not yet watched (or otherwise interacted with). "Gaps" may also be episodes from other series with enough in common with the user's activity as to warrant inclusion in a binge of viewing/activity involving missed episodes of series the user has interacted with. In general, any set of content the user may be interested in, not just content from series, may be formed into a "binge". The system may operate the timer 1504, attenuator 1506, and/or filter 108 to bound the binge in time, so as not to exceed or, in some cases, not to fall below a binge viewing period of time.

In one embodiment, the "binge" machine interface controls 130 are formed to include activation of a set of content including missed episodes of series the user has viewed already, from a same or different seasons or runs.

Thus in one embodiment the content aggregator 1512 receives activity/viewing gaps, content series, and other content, and applies these settings to form a binge recommendation for the user. The end user devices 1502 receive machine interface controls 130 which may be operated for selection of a binge experience.

Figure 16:
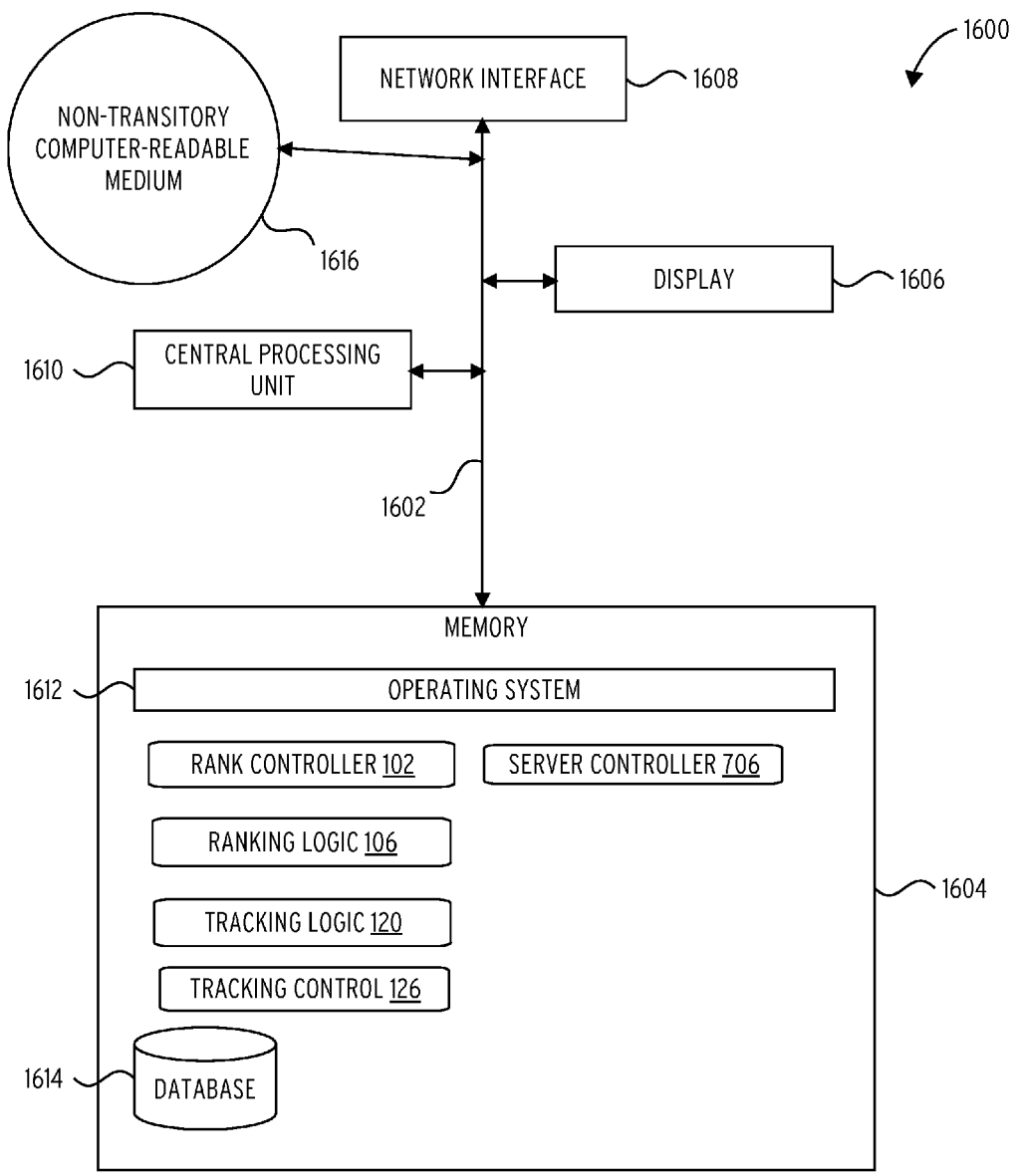
FIG. 16 illustrates a machine 1600 in accordance with one embodiment.

FIG. 16 illustrates several components of an exemplary machine 1600 in accordance with one embodiment. In various embodiments, machine 1600 may include a desktop PC, server, workstation, mobile phone, laptop, tablet, set-top box, appliance, or other computing device that is capable of performing operations such as those described herein. In some embodiments, machine 1600 may include many more components than those shown in FIG. 16. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, machine 1600 may comprise one or more physical and/or logical devices that collectively provide the functionalities described herein. In some embodiments, machine 1600 may comprise one or more replicated and/or distributed physical or logical devices.

In some embodiments, machine 1600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Machine 1600 includes a bus 1602 interconnecting several components including a network interface 1608, a display 1606, a central processing unit 1610, and a memory 1604.

Memory 1604 generally comprises a random access memory ("RAM") and permanent non-transitory mass storage device, such as a hard disk drive or solid-state drive. Memory 1604 stores an operating system 1612.

These and other software components may be loaded into memory 1604 of machine 1600 using a drive mechanism (not shown) associated with a non-transitory computer-readable medium 1616, such as a floppy disc, tape, DVD/CD-ROM drive, memory card, or the like.

Memory 1604 also includes database 1614. In some embodiments, server 200 (deleted) may communicate with database 1614 via network interface 1608, a storage area network ("SAN"), a high-speed serial bus, and/or via the other suitable communication technology.

In some embodiments, database 1614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method of setting controls on a digital communication device operated by an end user participant in a digital content event provided from a digital communication network, the method comprising:
    operating a tracking control in the digital communication network to track activity of the digital communication device in a context of the digital content event;
    applying the activity to a content series detector;
    applying an output of the content series detector to a series gap detector;
    operating a timer in conjunction with the activity and an output of the series gap detector to form a time-stamped set of ranking controls;
    attenuating the time-stamped set of ranking controls according to an elapsed time;
    applying the time-stamped set of ranking controls and content inputs from a digital content manager to operate a ranking control and digital filter to generate a control interface for the digital communication device, the control interface comprising a plurality of individually operable controls;
    operating a sub-stream filter on the digital content event to generate an extracted digital sub-stream;
    operating a speech-to-text converter on the extracted digital sub-stream to generate a digital text sequence;
    applying the digital text sequence to adapt the time-stamped set of ranking controls into adapted ranking controls of the control interface; and
    configuring the digital communication device with the control interface.

2. The method of claim 1, further comprising:
    correlating the time-stamped set of ranking controls with ranking controls of non-users of the digital communication device to produce the adapted ranking controls.

3. The method of claim 1, further comprising:
    operating the tracking control on a digital personal video recorder associated with the digital communication device.

4. The method of claim 1, further comprising:
    the outputs of the content series detector and the series gap detector applied to a content aggregator.

5. The method of claim 1, the plurality of individually operable controls each operable to cause a video server to stream a different digital video to the digital communication device.

6. The method of claim 1, further comprising:
    correlating the digital content event to serial content based on a threshold level of the serial content represented in the time-stamped set of ranking controls;
    detecting gaps in the activity associated with the serial content represented in the time-stamped set of ranking controls; and
    adapting the control interface with controls corresponding to the gaps.

7. A computing apparatus, the computing apparatus comprising:
    a processor; and
    a memory storing instructions that, when executed by the processor, configure the apparatus to:
        operate a tracking control in a digital communication network to track activity of a digital communication device in a context of a digital content event;
        apply the activity to a content series detector;
        apply an output of the content series detector to a series gap detector;
        operate a timer in conjunction with the activity and an output of the series gap detector to form a time-stamped set of ranking controls;
        attenuate the time-stamped set of ranking controls according to an elapsed time;
        apply the time-stamped set of ranking controls and content inputs from a digital content manager to operate a ranking control and digital filter to generate a control interface for the digital communication device, the control interface comprising a plurality of individually operable controls;

operate a sub-stream filter on the digital content event to generate an extracted digital sub-stream;

operate a speech-to-text converter on the extracted digital sub-stream to generate a digital text sequence;

apply the digital text sequence to adapt the time-stamped set of ranking controls into adapted ranking controls of the control interface; and configure the digital communication device with the control interface.

8. The computing apparatus of claim 7, wherein the instructions further configure the apparatus to:

correlate the time-stamped set of ranking controls with ranking controls of non-users of the digital communication device to produce the adapted ranking controls.

9. The computing apparatus of claim 7, wherein the instructions further configure the apparatus to:

operate the tracking control on a digital personal video recorder associated with the digital communication device.

10. The computing apparatus of claim 7, wherein the instructions further configure the apparatus to:

the outputs of the content series detector and the series gap detector applied to a content aggregator.

11. The computing apparatus of claim 7, the plurality of individually operable controls each operable to cause a video server to stream a different digital video to the digital communication device.

12. The computing apparatus of claim 7, wherein the instructions further configure the apparatus to:

correlate the digital content event to serial content based on a threshold level of the serial content represented in the time-stamped set of ranking controls;

detect gaps in the activity associated with the serial content represented in the time-stamped set of ranking controls; and adapt the control interface with controls corresponding to the gaps.

13. A non-transitory computer-readable storage medium, the computer-readable storage medium including instructions that when executed by a device including a processor and memory, uniquely configure the memory and cause the device to:

operate a tracking control in a digital communication network to track activity of a digital communication device in a context of a digital content event;

apply the activity to a content series detector;

apply an output of the content series detector to a series gap detector;

operate a timer in conjunction with the activity and an output of the series gap detector to form a time-stamped set of ranking controls;

attenuate the time-stamped set of ranking controls according to an elapsed time;

apply the time-stamped set of ranking controls and content inputs from a digital content manager to operate a ranking control and digital filter to generate a control interface for the digital communication device, the control interface comprising a plurality of individually operable controls;

operate a sub-stream filter on the digital content event to generate an extracted digital sub-stream;

operate a speech-to-text converter on the extracted digital sub-stream to generate a digital text sequence;

apply the digital text sequence to adapt the time-stamped set of ranking controls into adapted ranking controls of the control interface; and configure the digital communication device with the control interface.

14. The computer-readable storage medium of claim 13, wherein the instructions further configure the memory to cause the device to:

correlate the time-stamped set of ranking controls with ranking controls of non-users of the digital communication device to produce the adapted ranking controls.

15. The computer-readable storage medium of claim 13, wherein the instructions further configure the memory to cause the device to:

operate the tracking control on a digital personal video recorder associated with the digital communication device.

16. The computer-readable storage medium of claim 13, wherein the instructions further configure the memory to cause the device to:

the outputs of the content series detector and the series gap detector applied to a content aggregator.

17. The computer-readable storage medium of claim 13, the plurality of individually operable controls each operable to cause a video server to stream a different digital video to the digital communication device.

18. The computer-readable storage medium of claim 13, wherein the instructions further configure the memory to cause the device to:

correlate the digital content event to serial content based on a threshold level of the serial content represented in the time-stamped set of ranking controls;

detect gaps in the activity associated with the serial content represented in the time-stamped set of ranking controls; and adapt the control interface with controls corresponding to the gaps.

* * * * *